United States Patent
Baertsch

(10) Patent No.: US 11,155,169 B2
(45) Date of Patent: Oct. 26, 2021

(54) ALTITUDE CONTROL ALONG SEGMENTED TRACK

(71) Applicant: SKYTRAN, INC., Moffett Field, CA (US)

(72) Inventor: Robert Baertsch, Santa Cruz, CA (US)

(73) Assignee: SKYTRAN, INC., Huntington Beach, CA (US)

( * ) Notice: Subject to any disclaimer, the term of this patent is extended or adjusted under 35 U.S.C. 154(b) by 291 days.

(21) Appl. No.: 16/304,106

(22) PCT Filed: May 24, 2017

(86) PCT No.: PCT/US2017/034338
§ 371 (c)(1),
(2) Date: Nov. 21, 2018

(87) PCT Pub. No.: WO2017/205546
PCT Pub. Date: Nov. 30, 2017

(65) Prior Publication Data
US 2020/0324654 A1 Oct. 15, 2020

Related U.S. Application Data

(60) Provisional application No. 62/340,568, filed on May 24, 2016.

(51) Int. Cl.
*B60L 13/06* (2006.01)
*B61B 3/02* (2006.01)
(Continued)

(52) U.S. Cl.
CPC ............ *B60L 13/06* (2013.01); *B61B 3/02* (2013.01); *B61L 15/0072* (2013.01); *B61L 23/047* (2013.01); *B60L 2200/26* (2013.01)

(58) Field of Classification Search
CPC .......... B60L 3/02; B60L 3/06; B60L 15/0072; B60L 23/047; B60L 2200/26; F41G 7/30;
(Continued)

(56) References Cited

U.S. PATENT DOCUMENTS

| | | | | |
|---|---|---|---|---|
| 60,520 A | * | 12/1866 | Hurd | G10C 3/18 84/237 |
| 77,898 A | * | 5/1868 | Longanecker | A01D 9/00 294/55.5 |

(Continued)

FOREIGN PATENT DOCUMENTS

| | | |
|---|---|---|
| CN | 1167467 A | 12/1997 |
| EP | 0767095 A1 | 4/1997 |

(Continued)

OTHER PUBLICATIONS

International Search Report and Written Opinion from the International Searching Authority, dated Aug. 22, 2017, 13 pages, for the corresponding International Application PCT/US17/34338.

*Primary Examiner* — Jason C Smith
(74) *Attorney, Agent, or Firm* — Polsinelli PC

(57) ABSTRACT

Method for controlling altitude of a vehicle moving along a segmented track. The method including receiving, at a controller, data generated by one or more sensors and determining, at the controller, an altitude of the vehicle relative to the segmented track. The method then receives, at the controller, data relating to the length of a track segment between two or more supports and the weight of the vehicle and determining, at the controller, a speed of the vehicle relative to the length of the track segment. The method also calculating, at the controller, the deflection of the segmented track between two supports based on the length of the track segment, the weight of the vehicle, and the speed of the vehicle. The controller adjusts the altitude of the vehicle (Continued)

relative to the segmented track by an offset equivalent to the deflection of the segmented track thereby maintaining a constant altitude.

20 Claims, 9 Drawing Sheets

(51) Int. Cl.
  *B61L 15/00* (2006.01)
  *B61L 23/04* (2006.01)
(58) Field of Classification Search
  CPC .......... F41G 7/303; F41G 7/305; F41G 7/306; F41G 7/2206
  See application file for complete search history.

(56) References Cited

U.S. PATENT DOCUMENTS

| | | | | |
|---|---|---|---|---|
| 158,955 | A * | 1/1875 | Lieb | A45C 3/06 150/112 |
| 175,077 | A * | 3/1876 | Green | A01B 35/08 172/333 |
| 272,716 | A * | 2/1883 | Lewis | A01C 15/16 222/625 |
| 5,647,477 | A | 7/1997 | Morishita | |
| 2003/0175077 | A1* | 9/2003 | Godbersen | E01C 23/07 404/84.2 |
| 2008/0272716 | A1* | 11/2008 | Yu | H02P 25/062 318/135 |
| 2009/0158955 | A1* | 6/2009 | Pulliam | B61B 13/00 104/168 |
| 2011/0077898 | A1* | 3/2011 | Loomis | G01C 21/12 702/141 |
| 2013/0060520 | A1* | 3/2013 | Amor | G01C 15/008 702/154 |
| 2020/0130514 | A1* | 4/2020 | Baertsch | B60L 13/06 |
| 2020/0324654 | A1* | 10/2020 | Baertsch | B61L 23/047 |

FOREIGN PATENT DOCUMENTS

| | | |
|---|---|---|
| WO | WO 2015/158543 A1 | 10/2015 |
| WO | WO 2016/040374 A1 | 3/2016 |

* cited by examiner

ALTITUDE CONTROL ALONG SEGMENTED TRACK

CROSS REFERENCE TO RELATED APPLICATIONS

This application is a U.S. National Stage Entry of PCT Application No. PCT/US2017/034338, filed May 24, 2017, which claims benefit of U.S. Provisional Application No. 62/340,568 filed May 24, 2016, the contents of which are entirely incorporated herein.

FIELD

The present disclosure relates to altitude control of a vehicle along a segmented track. More specifically, the present disclosure relates to maintaining a line of travel of a magnetic levitation vehicle traveling along a segmented track.

BACKGROUND

Transportation systems are designed to move people and cargo over distances. Transportation systems can include a vehicle that is configured to traverse a roadway or a track. The vehicle can include a suspension system that is configured to modify the motion of the passenger or cargo compartment of the vehicle to reduce vibration or other motion of the passenger or cargo compartment relative to the track or roadway.

BRIEF DESCRIPTION OF THE DRAWINGS

Implementation of the present technology will now be described, by way of example only, with reference to attached figures, wherein.

Figure 1:
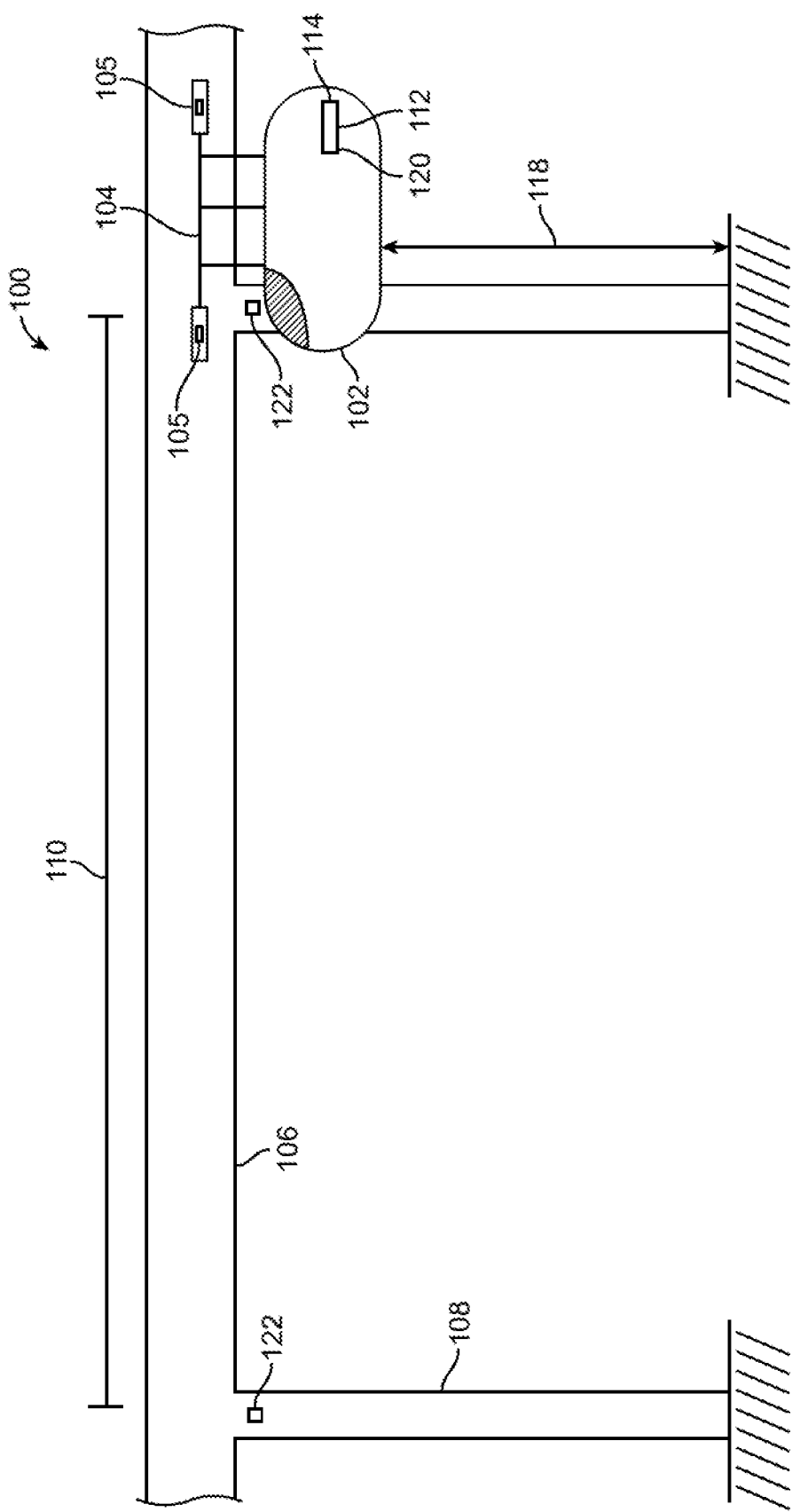
FIG. 1 is a diagrammatic view of an example of a vehicle entering a length of a segmented track.

The various embodiments described above are provided by way of illustration only, may not be shown to scale, and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims. Claim language reciting "at least one of" a set indicates that one member of the set or multiple members of the set satisfy the claim.

DETAILED DESCRIPTION

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The term "levitation" as used herein refers to the lifting and suspension of an object relative to another object in the absence of a mechanical contact between the objects. "Levitation force" is a force that provides for levitation. The levitation force can act in a vertical direction (the direction opposite the direction of gravity), but the same force can be used to move or position two objects in a lateral direction or in some direction with both vertical and lateral components. To generalize, the terms "levitation" and "levitation force" as used herein refer, respectively, to contactless positioning and a force between two objects in a direction substantially orthogonal to the primary direction of travel. As further used herein, "levitation magnetic flux" and "levitation force" are interchangeable and refer to the same element. A "levitation generator" is a device that is configured to generate magnetic waves that interact with a lifting member to levitate the movable object with respect to the stationary object.

"Drive force" refers to the force required to accelerate, maintain motion or decelerate one object with respect to another. As used herein, "drive force" means a force substantially in line with the primary direction of travel, effected without mechanical contact between the two objects. As further used herein, "drive magnetic flux" and "drive force" are interchangeable and refer to the same element. A "drive generator" is a device that is configured to generate magnetic waves that interact with a drive member to drive the movable object with respect to the stationary object. This application incorporates by reference in its entirety U.S. Pat. No. 9,090,167, entitled "Drive System for a Transportation System," filed Jun. 26, 2012.

A "guideway" is a device or structure that provides for a path along which a car, vehicle, bogie, or transport apparatus can move along. As used herein, the term guideway and track are interchangeable and refer to the same element. A car refers to a device which is configured for travel along the guideway. The car can be at least partially enclosed, entirely enclosed or have a surface upon which objects or persons can be placed. The car can be coupled with a bogie which is in turn coupled with the guideway. The bogie can be an integral component of the car or a separate component to which the car can be coupled with. A bogie as used herein does not necessarily include wheels, but instead is configured for engagement with the guideway.

A "controller" is generally a computer (carried on the vehicle) that executes a program to analyze data, make decisions, and send out commands. The controller can be an electronic device including, but not limited to, a processor, microprocessor, memory (read only memory (ROM) and/or random access memory (RAM)), and/or storage devices. The controller can be a commercial off-the-shelf (COTS) electronic device, or a specially designed for implementation with the altitude control system.

"Coupled" refers to the linking or connection of two objects. The coupling can be direct or indirect. An indirect coupling includes connecting two objects through one or more intermediary objects. Coupling can also refer to electrical or mechanical connections. Coupling can also include magnetic linking without physical contact. "Substantially" refers to an element essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. A "magnetic source" is any material that naturally produces a magnetic field or can be induced to generate a magnetic field. For example, a magnetic source can include a permanent magnet, an electromagnet, a superconductor, or any other material that produces a magnetic field or can be induced to generate a magnetic field. The term "pitch" is defined as the vertical angle of the long axis of the levitation generator relative to the travel direction, or travel plane. The term "yaw" is defined as a rotation or oscillation of the vehicle about a vertical axis.

The various embodiments described above are provided by way of illustration only and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims. Claim language reciting "at least one of" a set indicates that one member of the set or multiple members of the set satisfy the claim. For example, at least one of A, B, and C, indicates the members can be just A, just B, just C, A and B, A and C, B and C, or A, B, and C.

The present disclosure is directed to a method controlling altitude of a vehicle moving along a segmented track. The method receives, at a controller, data generated by one or more sensors and determines, at the controller, an altitude of the vehicle relative to the segmented track. The method then receives, at the controller, data relating to the length of a track segment between two or more supports and the weight of the vehicle and determines, at the controller, a speed of the vehicle relative to the length of the track segment. The method also calculates, at the controller, the deflection of the segmented track between two supports based on the length of the track segment, the weight of the vehicle, and the speed of the vehicle. The controller adjusts the altitude of the vehicle relative to the segmented track by an offset equivalent to the deflection of the segmented track thereby maintaining a constant altitude of the vehicle relative to a travel plane. The method can also calculate, at the controller, the offset by subtracting the deflection from the altitude.

The deflection of the segmented track can be calculated using a static finite element analysis (FEA) model. The levitation of the vehicle can be adjusted by changing the pitch angle of the levitation generator. The levitation generator is configured to generate lift as it passes within the segmented track. The vehicle can include a levitation generator having one or more altitude sensors disposed thereon and the levitation generator configured to be received within the segmented track. The one or more altitude sensors can be ultrasonic sensors configured to interact with the segmented track. The levitation of the vehicle can also be adjusted by changing the speed of the vehicle, thereby altering the levitation generated. In at least one embodiment, increasing the speed of the vehicle increases the levitation generated and decreasing the speed of the vehicle decreases the levitation of the vehicle.

The data received relating to the length of the track segment can be the length of two or more track segments. In at least one embodiment, the method can receive data relating to the length of two track segments. In other embodiments, the method can receive data relating to the length of three, four, or any number of track segments. The data relating to the distance between supports can also include scanning an RFID tag disposed on each support. In other embodiments, the data relating to the distance between supports can include scanning a barcode disposed on each support. In yet other embodiments, the data relating to the distance between two or more supports can include getting position information from global positioning system (GPS) and retrieving the distance from a stored database.

While the present disclosure is shown and described depicting one, two, or three vehicles in a specific portion of a segmented guide way, it is within the scope of this disclosure for the method to control altitude with more than three vehicles within a segmented guide way. While examples are illustrated in relation to a substantially horizontal guide way, the present disclosure also includes guide ways that are vertically oriented, or any angle therebetween. In such vertically oriented guideways, the system can more closely resemble an elevator. In other systems, the guide way can include component that are horizontal, vertical, angled, or any combination thereof.

FIG. 1 illustrates an example embodiment of a levitation transportation system 100 with a vehicle 102 entering a segmented track 106. The levitation transportation system 100 has a track formed by a plurality of segmented track 106 pieces. Each segmented track 106 piece is supported by one or more supports 108 and the segmented track pieces can have various lengths 110. While the illustrated embodiment shows a segmented track segment 106 having a support 108 on opposing ends, to the segmented track can include supports 108 that have varying arrangements, such as having a center support 108 with secondary supports extending therefrom.

The segmented track 106 pieces can form a network of track allowing a vehicle 102 to move within the levitation transportation system 100. While the piece of segmented track 106 that is illustrated spans the portion between two supports 108, the piece can only be a portion of the span and be joined to another piece of segmented track 106 on either side, such that a plurality of pieces span the portion between the two supports 108. The vehicle 102 has a levitation generator 104 at least partially received within the segmented track 106 and allows the vehicle 102 to travel within the levitation transportation system 100. The levitation generator 104 can magnetically engage and interact with the segmented track 106 to guide the vehicle 102 along the transportation system 100. The levitation generator 104 and the segmented track 106 are not designed to physically touch as the vehicle 102 travels within the levitation transportation system 100, rather the levitation generator 104 generates a levitating magnetic force to elevate the levitation generator 104 above or at a spaced distance (but within the segmented track) from the segmented track 106.

The vehicle 102 can include an altitude control system 112 capable of maintaining a predetermined altitude 118 as the vehicle 102 traverses within the levitation transportation system 100. The segmented track 106 can have a deflection 116 over the length 110 between supports 108. The deflection 116 can occur due to a variety of different factors. For example, the deflection 116 can occur due to the weight of the segmented track 106 itself. Additionally, the defection can occur because of the weight of one or more vehicles 102 traveling along the segmented track 106. The altitude control system 112 can adjust the levitation of the vehicle 102 to offset for the deflection of the segmented track 106 and maintain the predetermined altitude 118. The altitude control system 112 can include a controller 114 configured to receive and determine information about the vehicle 102 and segmented track 106. The controller 114 can be a processor, microprocessor, computer, server, or any other electronic device capable of determining the deflection of the length 110 of segmented track 106 in response to information received from one or more sensors.

The controller 114 receives relevant information related to the levitation transportation system 100 such as the predetermined altitude 118, the spacing of supports 108, and the length 110 of the segmented track. The controller 114 can determine information such as the weight and speed of the vehicle 102. The weight of the vehicle 102 can include the weight of the vehicle 102, weight of passengers, payload, cargo, or any combination thereof. In at least one embodiment, the controller 114 determines the weight of the vehicle 102 instantaneously. In at least one embodiment, the controller 114 determines, instantaneously, the weight of the vehicle 102, along with contents of the vehicle 102, which can include one or more of the passengers, payload, cargo. In other embodiments, the controller 114 receives the weight of the vehicle 102 at launch of the vehicle 102 within the levitation transportation system 100.

The altitude control system 112 can receive data from one or more sensors 120 coupled with the levitation transportation system 100. The one or more sensors 120 can be disposed on the vehicle 102, the segmented track 106, and/or the supports 108. The one or more sensors 120 can be optical, radio, and/or near field communicator configured to determine altitude, speed, weight, location, or any combination thereof. The one or more sensors 120 provide the altitude control system 112 with data necessary to determine deflection 116 of the segmented track 106. In at least one embodiment, the one or more sensors 120 include at least one altitude sensor 105 disposed on the like levitation generator 104. The one or more altitude sensors 105 can be ultrasonic sensors configured to interact with the segmented track 106. In at least one instance, the levitation generator 104 can be more than one levitation generators, for example one front levitation generator and one rear levitation generator or two front levitation generators and two rear levitation generators.

In additional embodiments, the one or more sensors 120 can include laser sensors configured to encode and/or transmit data between adjacent vehicles 102. The encoded/transmitted data can be the length 110 of segmented track, deflection of the segmented track, speed of adjacent vehicles, weight of adjacent vehicles, and/or any other data necessary to the altitude control system 112.

As can be seen in FIG. 1, the one or more sensors 120 can be communicatively coupled with a transmitter 122 disposed on the support 108 to receive data relative to the length 110 of segmented track 106. The data assists the altitude control system 112 in determining the anticipated deflection 116 of the upcoming length 110 of segmented track 106 as the vehicle 102 travels along the segmented track 106. At least one of the one or more sensors 120 can communicate with the transmitter 122 disposed on the support 108 to receive data relating the length 110 of the track segment 106. The transmitter 122 can be a barcode 124, such as a Quick Response (QR) code, a Radio Frequency Identification (RFID) tag, or similar device configured to provide data to the one or more sensors 120.

The transmitter 122 can be disposed on the support 108, the segmented track 106, or any portion of the levitation transportation system 100 with communication range of the one or more sensors 120. In the illustrated embodiment, the transmitter 122 is on the support 108. The transmitter 122 can be located at different portions of the levitation transportation system 100. For example, the transmitter 122 can be located on the track segment 106 at joint or in the middle. The data associated with the transmitter 122 can be static or dynamic. In situations where the data associated with the transmitter 122 is dynamic, the data received by the vehicle 102 can include the weight of the preceding vehicle(s) 102, the temperature of the rail, the ambient air temperature, the weight of the following vehicle(s) 102, or any other necessary information.

The transmitter 122 can store data relating to the length 110 of track between two or more supports 108. In FIG. 1, the transmitter 122 communicates the length 110 of segmented track 106 between two poles. In other embodiments, the transmitter 122 can communicate data relating to two or more lengths 110 of segmented track 106, thus reducing the total number of transmitters 122 necessary within the levitation transportation system 100.

Figure 2:
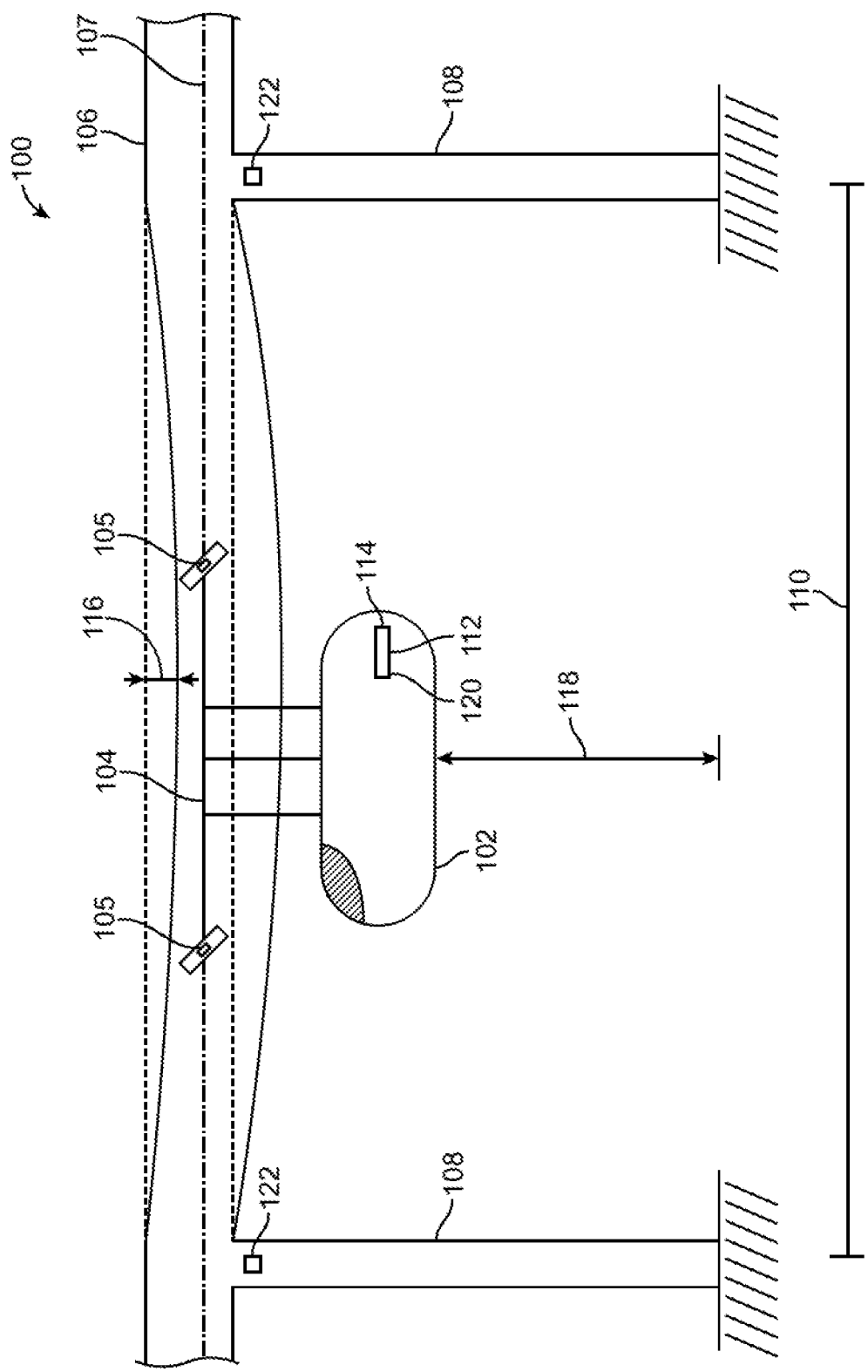
FIG. 2 is a diagrammatic view of an example of a levitation generator maintaining a predetermined altitude of a vehicle along a deflected segmented track.

FIG. 2 illustrates a vehicle 102 within a deflected length 110 of segmented track 106 of a levitation transportation system 100. The length 110 of segmented track 106 deflects from the weight of the vehicle 102. The deflection 116 is mathematically predictable and can be calculated using the known weight and speed of the vehicle 102, and length 110 of the segmented track 106. The controller 114 can calculate the deflection 116 of the segmented track 106 in view of the vehicle 102 weight, speed, and the length 110 of the segmented track 106. The controller 114 then adjusts the levitation of the vehicle 102 to accommodate for the deflection 116 and maintain the predetermined altitude 118.

The controller 114 can adjust the levitation of the vehicle 102 to maintain the predetermined altitude 118 in a number of ways including, but not limited to, increasing the speed of the vehicle 102 or adjusting the pitch of the levitation generator 104, thereby generating more levitation. FIG. 2 illustrates a vehicle 102 having a levitation generator 104 pitched to increase levitation relative to the levitation generator of FIG. 1, thereby maintaining the predetermined altitude 118. In at least one instance, the levitation generator 104 can be substantially wing-shaped and adjusting the pitch of the levitation generator changes the angle of the levitation wing.

The segmented track 106 can have one or more markings 107 disposed on an inner surface thereof. The one or more markings 107 can project a level flight path on a deflected segmented track 106. The one or more markings 107 can be colored paint, reflective tape, reflective paint, or any similar marking providing a contrast with the inner surface of the segmented track 106. In some instances, the one or more markings 107 can be disposed on the inner surface to project a level flight path under different segmented track 106 situations, i.e. one vehicle, two vehicles, three vehicles.

The altitude sensors 105 on the levitation generator 104 can be capable of determining their position relative to the one or more markings 107, thereby maintaining a level flight path. The altitude sensors 105 can detect deviation away from the marking 107 and instruct the controller 114 to adjust the pitch of the levitation generator 104 to maintain the level flight path. The controller 114 can have pre-calculated deflection stored therein for each segmented track 106 under various circumstances. The controller 114 can adjust the levitation generator 104 and altitude sensors from one marking 107 to another marking 107 if conditions of the drive system 100 change, for example a vehicle entering/exiting the segmented track 106. In at least one instance, the controller can calculate levitation modulation using wing angles rate and the rate of change of the wing angles. The controller 114 can send levitation modulation signals to the levitation generator to adjust the altitude of the vehicle relative to the segmented track and the rate of change of altitude.

Figure 3:
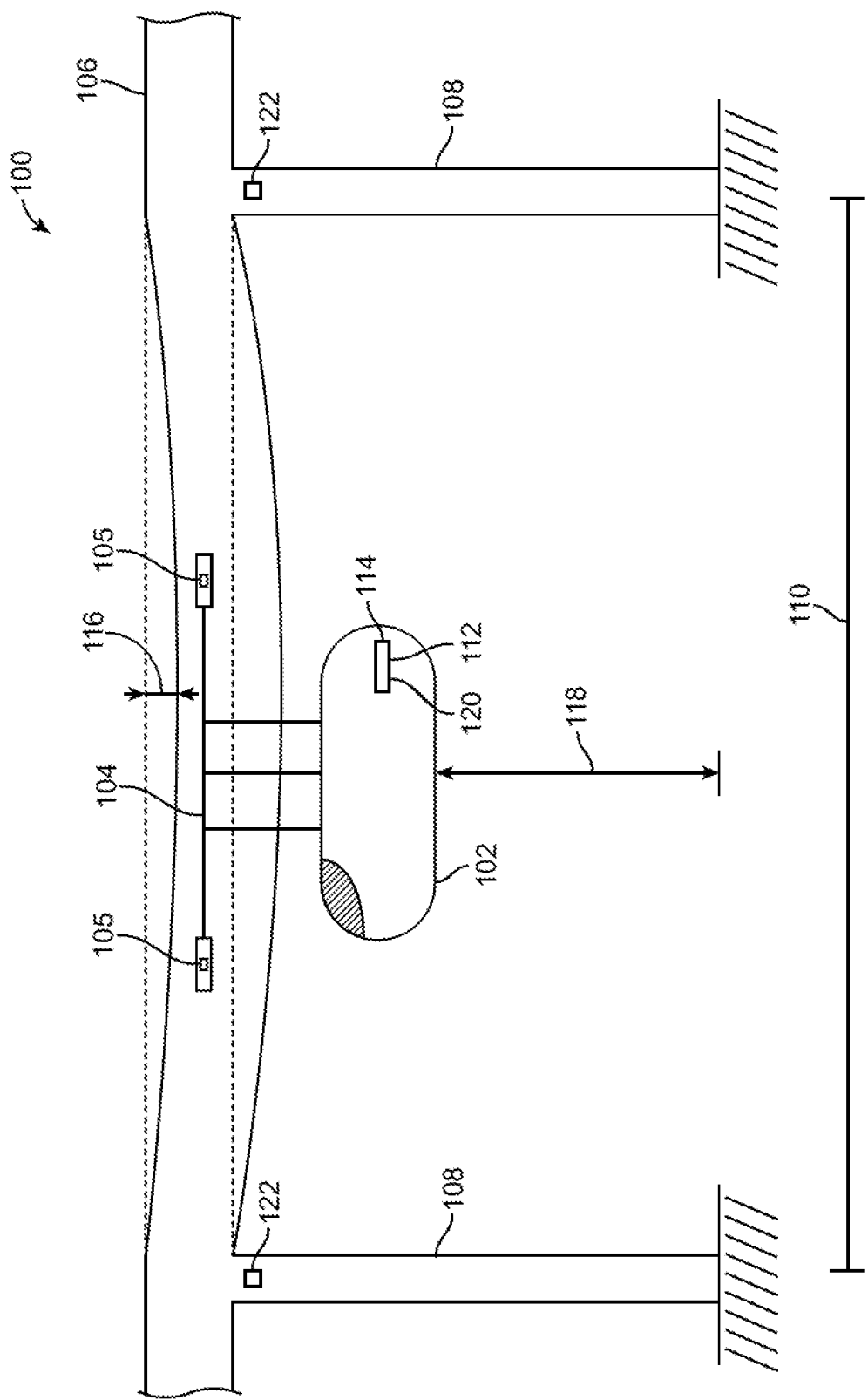
FIG. 3 is a diagrammatic view of an example of a vehicle having an increased speed to maintain a predetermined altitude.

FIG. 3 illustrates a vehicle 102 having an increased speed relative to the segmented track while having a levitation generator 104 with a substantially similar pitch to the levitation generator 104 of FIG. 1. The increased speed relative to the segmented track 106 increases the levitating force generated by the levitation generator 104, thus allowing the vehicle 102 to maintain the predetermined altitude 118 relative to the travel plane.

The controller 114 adjusts the levitation of the vehicle 102 to maintain a substantially linear direction of travel, the predetermined altitude 118. For example, in situations where the segmented track is arranged in a substantially non-horizontal configuration, such as a declining slope or an increasing slope, the controller 114 adjusts the levitation of the vehicle 102 to maintain the predetermined altitude 118 accounting for the deflection of the substantially non-horizontal segmented track 106.

Figure 4:
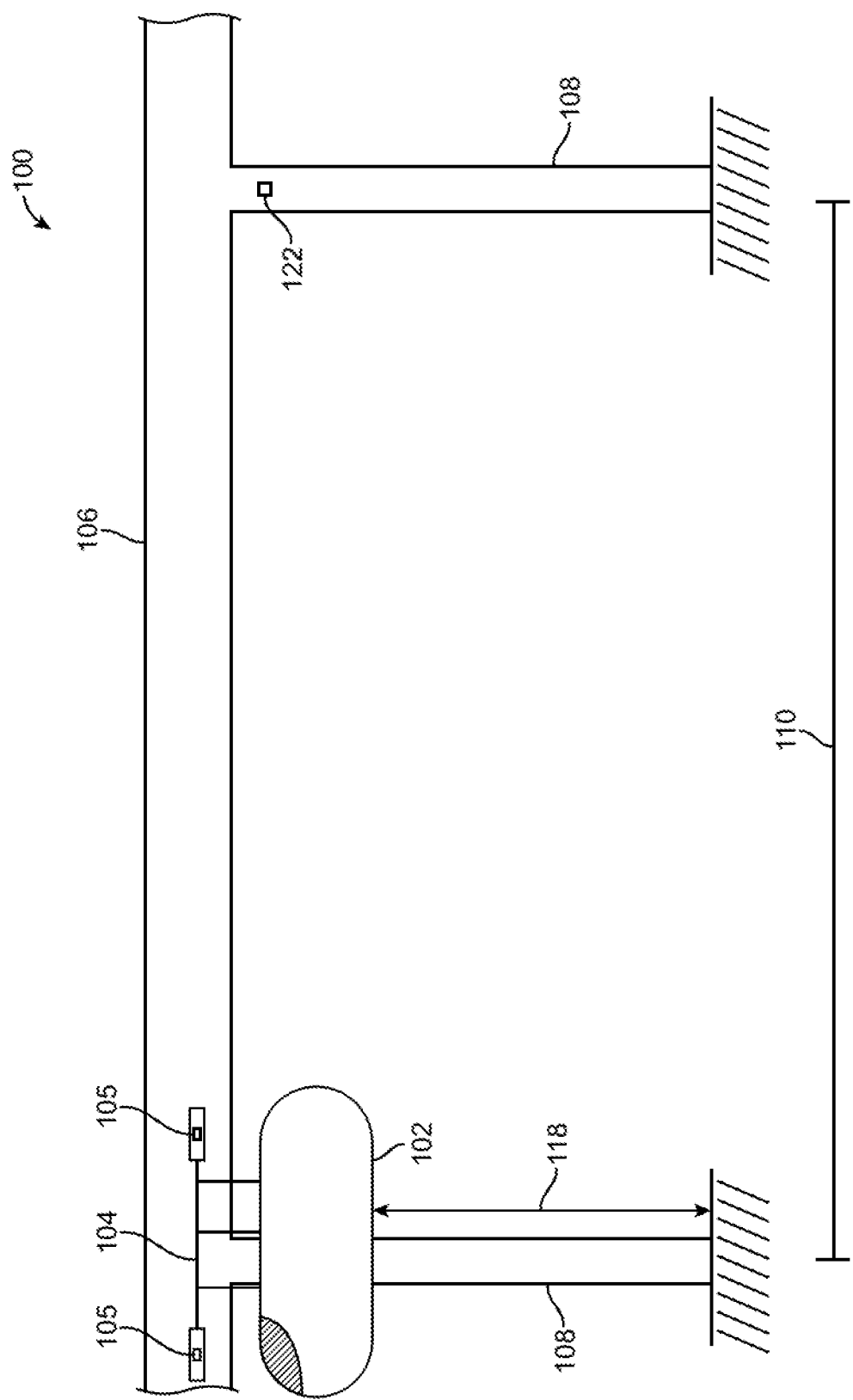
FIG. 4 is a diagrammatic view of an example of a vehicle exiting a length of a segmented track.

FIG. 4 illustrates a vehicle 102 departing a segmented track 106. As the vehicle 102 exits the length 110 of segmented track 106, the deflection 116 returns to a normal state, absent the weight of the vehicle 102. As the segmented track 106 returns to the normal state, the normal state being a substantially linear, non-deflected state, the altitude control system 112 readjusts the levitation to maintain the predetermined altitude 118. In at least one embodiment, the normal state can include a slight deflection caused by the weight of the segmented track and the weight of the one or more vehicles causes deflection relative to the normal state. As discussed above with respect to FIGS. 2 and 3, the altitude control system 112 can adjust the levitation of the vehicle 102 by increasing the speed, altering the pitch of the levitation generator 104, or a combination thereof. The vehicle 102 can then receive data from the transmitter 122 on the support 108 regarding the following length of segmented track.

Figure 5:
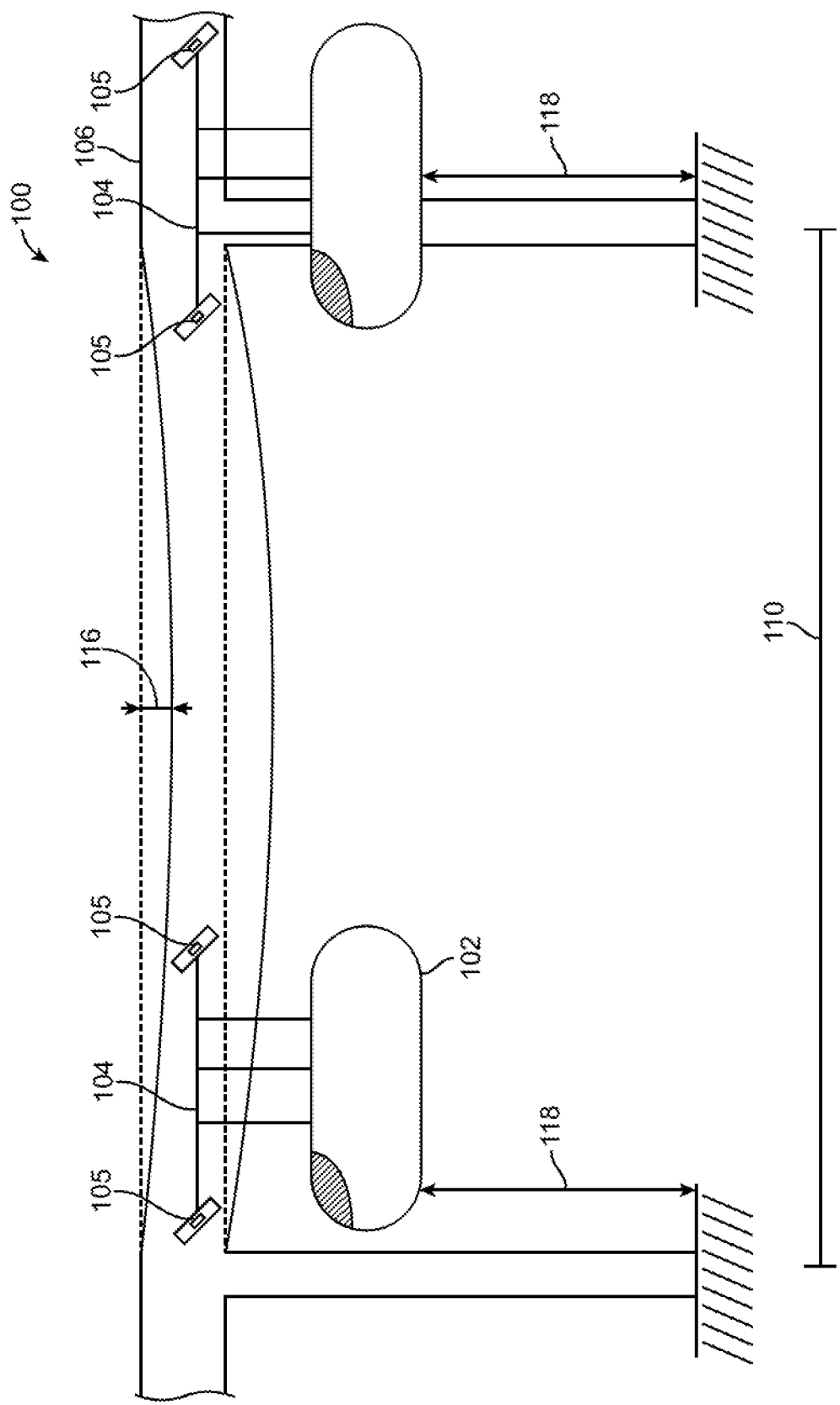
FIG. 5 is a diagrammatic view of an example of two vehicles moving along a length of a segmented track.

FIG. 5 illustrates two vehicles traversing a length 110 of segmented track 106. The altitude control system 112 can receive data relating to more than one vehicle 102. For example, two vehicles 102 are shown in FIG. 5, within a specific segmented track 106 and calculate the anticipated deflection 116 thereby allowing each vehicle 102 to maintain the predetermined altitude 118. The altitude control system 112 can receive data relating to the weight and speed of vehicles 102 ahead and behind using the one or more sensors 120 disposed on the vehicle 102. Each vehicle 102 can be communicatively coupled with adjacent or nearby vehicles 102, thereby providing the altitude control system with data relevant to calculation of the deflection 116. The vehicles 102 can be coupled with optical, radio, or any known short range communication system or a combination thereof. As used herein, adjacent vehicles 102 include the vehicle before and the vehicle after the vehicle of interest. Additionally, nearby vehicles 102 include more than just the adjacent vehicles and extend to those vehicles that the model needs to predict the necessary changes.

Figure 6:
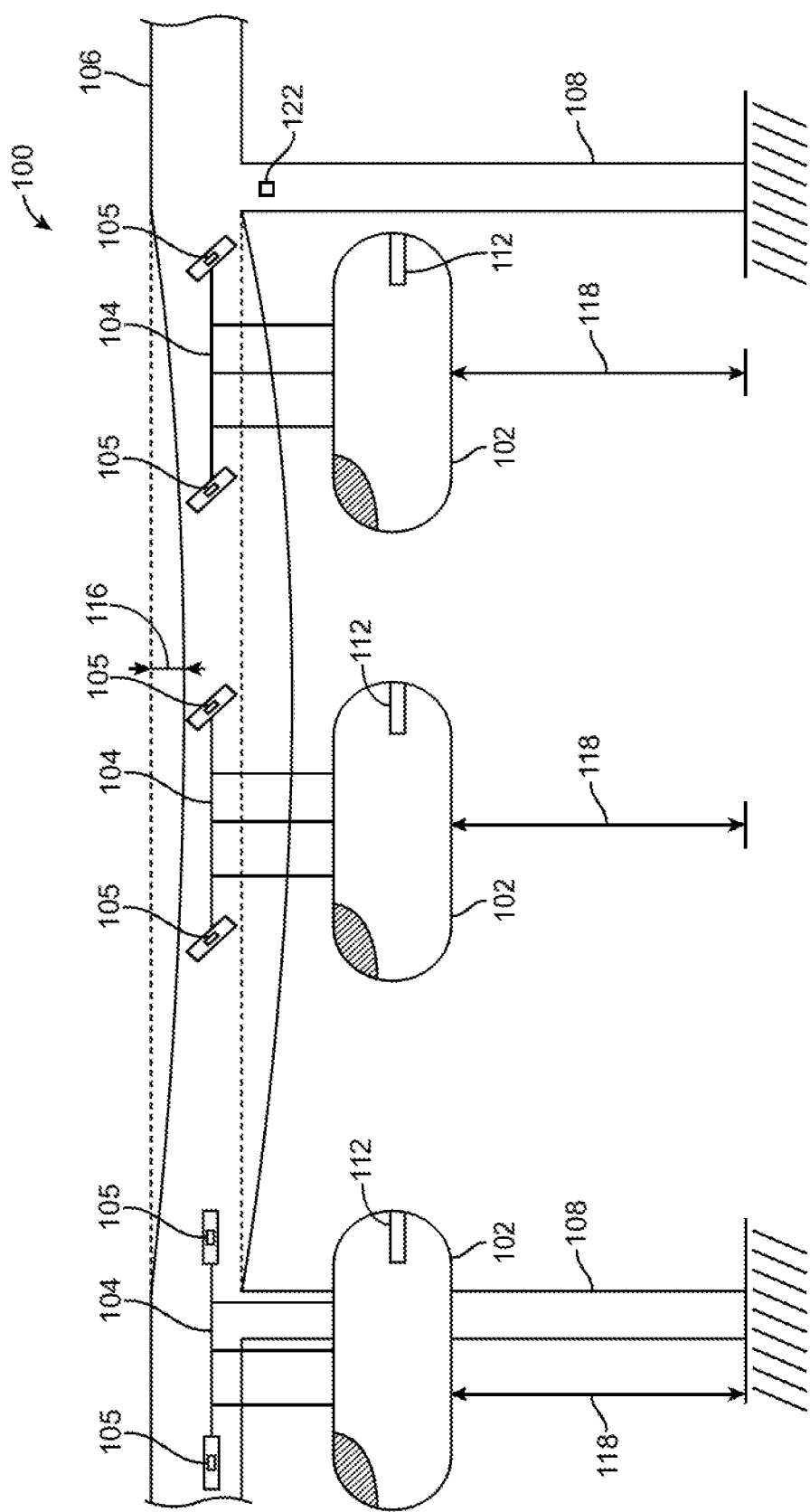
FIG. 6 is a diagrammatic view of an example of three vehicles moving a length of a segmented track.

FIG. 6 illustrates three vehicles traversing a length 110 of segmented track 106. The altitude control system 112 can receive data relating to more than one vehicle 102, three as shown in FIG. 6, within a specific segmented track 106 and calculate the anticipated deflection 116 thereby allowing each vehicle 102 to maintain the predetermined altitude 118.

The number of vehicles in a length 110 of segmented track 106 can vary depending on the length 110 of the segmented track, the vehicle 102 speed, the spacing between vehicles, the number of vehicles in the levitation transportation system 100, and/or the frequency/popularity of the path. Certain routes, destinations, or segmented tracks 106 can have a different use rate changing the potential number of vehicles 102 within a length 110 of segmented track 106.

While the illustrated embodiments describe one, two, or three vehicles 102 within a length 110 of segmented track 106, it is within the scope of this disclosure to have an altitude control system 112 configured to calculate the deflection of and maintain the predetermined altitude 118.

Figure 7:
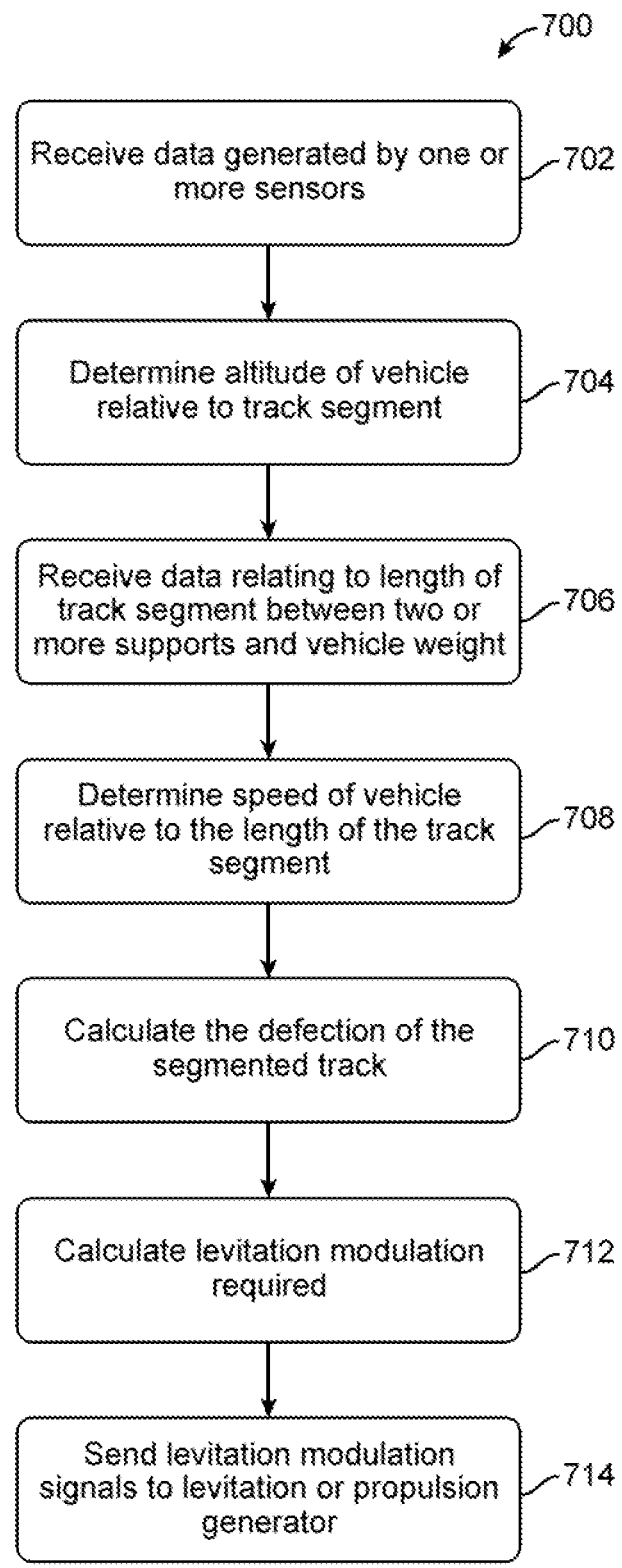
FIG. 7 is a flow chart of an example of a method for controlling altitude.

Referring to FIG. 7, a flowchart is presented in accordance with an example embodiment. The example method 700 is provided by way of example, as there are a variety of ways to carry out the method 700. The method 700 described below can be carried out using the configurations illustrated in FIGS. 1-6, for example. Each block shown in FIG. 7 represents one or more processes, methods or subroutines, carried out in the example method 700. Furthermore, the illustrated order of blocks is illustrative only and the order of the blocks can change according to the present disclosure. Additional blocks may be added or fewer blocks may be utilized, without departing from this disclosure. The example method 700 can begin at block 702.

At block 702, the method can be configured to receive, at a controller, data generated by one or more sensors. The data can include information about origination location, destination, ambient air temperature, weight of the vehicle.

At block 704, the method determines, at the controller, the altitude of the vehicle 102 relative to the track segment.

At block 706, the method receives data, at the controller, the length of the segmented track 106 between two or more supports.

At block 708, the method determines the speed of the vehicle relative to the length of the segmented track.

At block 710, the method calculates the deflection of the length of segmented track and offsets the calculated deflection to maintain the altitude of the vehicle.

At block 712, the method calculates the levitation modulation required. The levitation modulation can be determined by the altitude of the vehicle, the speed of the vehicle, and/or the deflection of the segmented track.

At block 714, the method can send levitation modulation signals to the levitation generator and/or propulsion generator. The levitation modulation signals can be sent from the vehicle by the controller to the levitation generator and/or propulsion generator. The levitation modulation signals can adjust the altitude of vehicle relative to the segmented track by a levitation modulation equivalent to the deflection of the segmented track. The altitude of the vehicle relative to the segmented track can be adjusted by increasing the speed of the vehicle and/or changing the pitch of the levitation generator, thereby maintaining a constant altitude of the vehicle relative to a travel plane.

In at least one instance, the controller can determine a rate of change of the vehicle relative to the segmented track, the angle of the one or more levitation generator, and the rate of change of the angle of the one or more levitation generators relative to the direction of travel.

Figure 8:
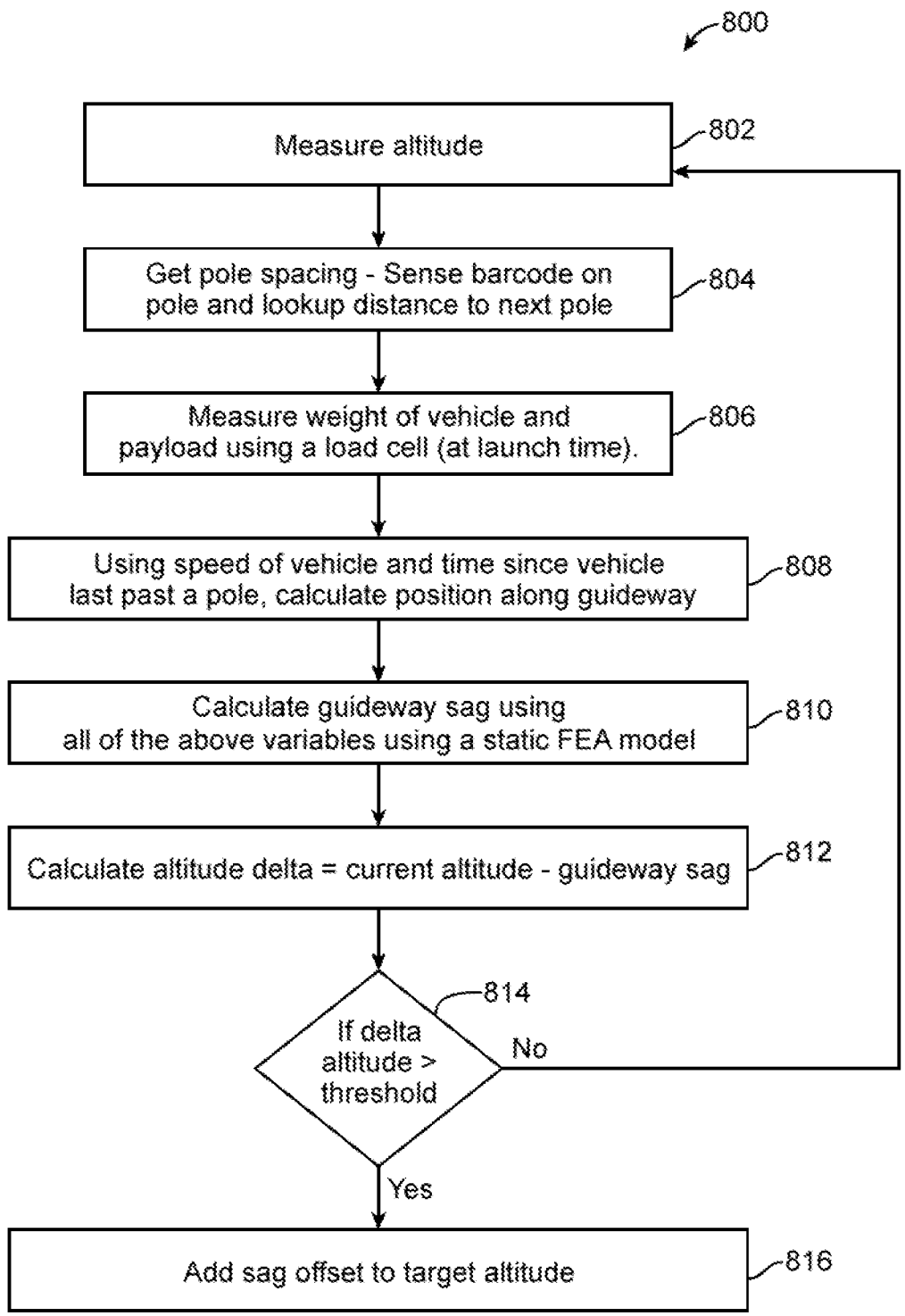
FIG. 8 is a flow chart of another example of a method for controlling altitude.

Referring to FIG. 8, a flowchart is presented in accordance with an example embodiment. The example method 800 is provided by way of example, as there are a variety of ways to carry out the method 800. The method 800 described below can be carried out using the configurations illustrated in FIGS. 1-6, for example. Each block shown in FIG. 8 represents one or more processes, methods or subroutines, carried out in the example method 800. Furthermore, the illustrated order of blocks is illustrative only and the order of the blocks can change according to the present disclosure. Additional blocks may be added or fewer blocks may be utilized, without departing from this disclosure. The example method 800 can begin at block 802.

At block 802, the method 800 can measure the altitude of the vehicle as it enters a length of segmented track.

At block 804, the method 800 can receive the spacing between supports. The method can receive the spacing between supports by scanning a barcode disposed on the support and receiving the known distance to the following support.

At block 806, the method 800 can measure the weight of the vehicle and payload using a load cell. In at least one embodiment, the weight measurement and payload measurement can be taken at launch of the vehicle into the levitation transportation system. In other embodiments, the weight measurement can occur in real time as the vehicle approaches each support.

At block 808, the method 800 determines the speed of the vehicle and the time since the previous support. The altitude control system can further determine the position of the vehicle within the levitation transportation system.

At block 810, the method 800 can calculate the deflection, or sag, of the segmented track. The deflection can be calculated using a static FEA model.

At block 812, the method 800 can calculate the altitude delta by subtracting the deflection from the altitude.

At block 814, the method 800 determines if the delta altitude is greater than zero, thus the segmented track has a deflection. If the delta altitude is zero, the altitude control system takes no action and method 800 ends. If the delta altitude is greater than zero, the method 800 proceeds to block 816.

At block 816, the method 800 adds the deflection offset to the altitude, thereby causing the levitation generator to increase levitation and maintain altitude.

Figure 9:
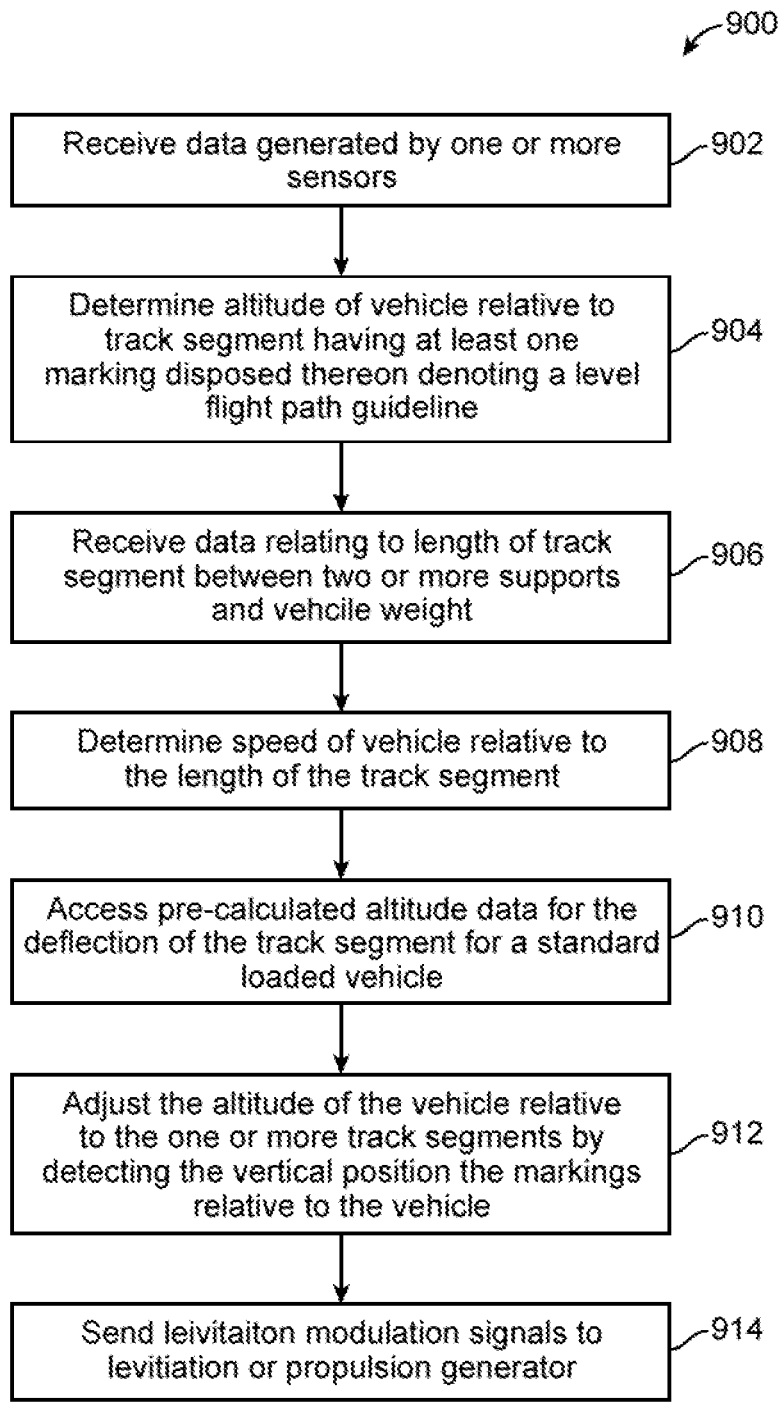
FIG. 9 is a flow chart of another yet example of a method for controlling altitude.

Referring to FIG. 9, a flowchart is presented in accordance with an example embodiment. The example method 900 is provided by way of example, as there are a variety of ways to carry out the method 900. The method 900 described below can be carried out using the configurations illustrated in FIGS. 1-6, for example. Each block shown in FIG. 9 represents one or more processes, methods or subroutines, carried out in the example method 900. Furthermore, the illustrated order of blocks is illustrative only and the order of the blocks can change according to the present disclosure. Additional blocks may be added or fewer blocks may be utilized, without departing from this disclosure. The example method 900 can begin at block 902.

At block 902, the method 900 can receive data generated by one or more sensors.

At block 904, the method 900 can determine the altitude of the vehicle relative to the track segment having at least one marking disposed thereon denoting a level flight path guideline.

At block 906, the method 900 can receive data relating to the length of the track segment between two or more supports and the vehicle weight.

At block 908, the method 900 can determine the speed of the vehicle relative to the length of the track segment.

At block 910, the method 900 can access pre-calculated altitude data for the deflection of the track segments for a standard loaded vehicle.

At block 912, the method 900 can adjust the altitude of the vehicle relative to the one or more track segments by detecting the vertical position the markings relative to the vehicle.

At block 914, the method 900 can send, via the controller, levitation modulation signals to levitation or propulsion generator.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. A method controlling altitude of a vehicle moving along a segmented track, the method comprising:
   receiving, at a controller, data generated by one or more sensors;
   determining, at the controller, an altitude of the vehicle relative to the segmented track;
   receiving, at the controller, data relating to the length of a track segment between two or more supports and the weight of the vehicle;
   determining, at the controller, a speed of the vehicle relative to the length of the track segment; and
   calculating, at the controller, a deflection of the segmented track between two supports based on the length of the track segment, the weight of the vehicle, and/or the speed of the vehicle,
   adjusting, via the controller, the altitude of the vehicle relative to the segmented track by an offset equivalent to the deflection of the segmented track thereby maintaining a constant altitude of the vehicle relative to a travel plane
   wherein the vehicle and the segmented track maintain contactless position therebetween.

2. The method of claim 1, wherein the deflection of the segmented track is calculated using a static finite element analysis (FEA) model.

3. The method of claim 1, further comprising calculating the offset by subtracting the deflection from the altitude.

4. The method of claim 1, wherein the altitude of the vehicle relative to the segmented track is adjusted by changing the angle of a levitation generator configured to generate lift as it passes within the segmented track.

5. The method of claim 1, wherein the altitude of the vehicle relative to the segmented track is adjusted by changing the speed of the vehicle, thereby altering the levitation generated.

6. The method of claim 5, wherein increasing the speed of the vehicle increases a levitation force generated by the levitation generator and decreasing the speed of the vehicle decreases the levitation force.

7. The method of claim 1, wherein the vehicle includes a levitation generator having one or more altitude sensors disposed thereon and the levitation generator configured to be received within the segmented track.

8. The method of claim 7, wherein the one or more altitude sensors are ultrasonic sensors configured to interact with the segmented track.

9. The method of claim 7, wherein the one or more altitude sensors are laser sensors configured to interact with the segmented track.

10. The method of claim 1, wherein the data received includes the distance of two or more track segments.

11. The method of claim 1, wherein data relating to the distance between supports further comprises scanning an RFID tag disposed in each support.

12. The method of claim 1, wherein data relating to the distance between two or more poles further comprises scanning a barcode disposed on each pole.

13. The method of claim 1, wherein data relating to the distance between two or more poles further comprises getting position from GPS and looking up the distance stored in a database.

14. A method controlling altitude of a vehicle moving along a segmented track, the method comprising:
   receiving, at a controller, data generated by one or more sensors;
   determining, at the controller, an altitude of the vehicle relative to the segmented track;
   receiving, at the controller, data relating to the length of a track segment between two or more supports and the weight of the vehicle;
   determining, at the controller, a speed of the vehicle relative to the length of the track segment; and
   calculating, at the controller, the deflection of the segmented track between two supports based on the length of the track segment, the weight of the vehicle, and the speed of the vehicle,
   calculating, at the controller, levitation modulation;
   send levitation modulation signals to levitation generator;
   wherein the levitation modulation signals adjust the altitude of the vehicle relative to the segmented track by levitation modulation equivalent to the deflection of the segmented track thereby maintaining a constant altitude of the vehicle relative to a travel plane,
   wherein the levitation generator and the segmented track maintain contactless position therebetween.

15. A method controlling altitude of a vehicle moving along a segmented track, the method comprising:
   receiving, at a controller, data generated by one or more sensors;
   determining, at the controller, an altitude of the vehicle relative to the segmented track;
   determining, at the controller, an rate of change of altitude of the vehicle relative to the segmented track;
   determining, at the controller, an angle of each of a plurality of individual levitation wings relative to a direction of travel;
   determining, at the controller, an rate of change of angle of each of the plurality of individual levitation wings relative to the direction of travel;
   receiving, at the controller, data relating to the length of a track segment between two or more supports and the weight of the vehicle;
   determining, at the controller, a speed of the vehicle relative to the length of the track segment; and
   calculating, at the controller, the deflection of the segmented track between two supports based on the length of the track segment, the weight of the vehicle, and the speed of the vehicle;
   calculating, at the controller, levitation modulation using wing angles, rate of change of wing angles, altitude, rate of change of altitude;
   sending levitation modulation signals to levitation generator, wherein the controller adjusts the altitude of the vehicle relative to the segmented track by levitation modulation equivalent to the deflection of the segmented track thereby maintaining a constant altitude of the vehicle relative to a travel plane,
   wherein the levitation generator and the segmented track maintain contactless position therebetween.

16. A method controlling altitude of a vehicle moving along a segmented track, the method comprising:
   receiving, at a controller, data generated by one or more sensors;
   determining, at the controller, an altitude of the vehicle relative to a track segment, the track segment having at least one marking disposed thereon denoting a level flight path guideline and the one or more sensors configured to detect the at least one marking;
   receiving, at the controller, data relating to the length of the track segment between two or more supports and the weight of the vehicle;
   determining, at the controller, a speed of the vehicle relative to the length of the track segment; and
   accessing, at the controller, pre-calculated and stored altitude data for the deflection of the one or more track segments for a standard loaded vehicle;
   adjusting the altitude of the vehicle relative to the one or more track segments by detecting the vertical position the markings relative to the vehicle, thereby maintaining a constant altitude of the vehicle relative to a desired flight path,
   wherein the vehicle and the segmented track maintain contactless position therebetween.

17. The method of claim 16, wherein as the track segment deflects from weight of the vehicle the at least one marking proportionally deflects and indicates the desired flight path.

18. An altitude control system comprising:
   a vehicle having a controller, the controller having a processor configured to store instructions that when executed cause the processor to:
   receive data generated by one or more sensors;
   determine an altitude of the vehicle relative to the segmented track;
   receive data relating to the length of a track segment between two or more supports and the weight of the vehicle;

determine a speed of the vehicle relative to the length of the track segment; and calculate the deflection of the segmented track between two supports based on the length of the track segment, the weight of the vehicle, and the speed of the vehicle, adjusts the altitude of the vehicle relative to the segmented track by an offset equivalent to the deflection of the segmented track thereby maintaining a constant altitude of the vehicle relative to a travel plane, wherein the vehicle and the segmented track maintain contactless position therebetween.

19. The system of claim 18, wherein the altitude of the vehicle relative to the segmented track is adjusted by changing the angle of a levitation generator configured to generate lift as it passes within the segmented track.

20. The system of claim 18, wherein the altitude of the vehicle relative to the segmented track is adjusted by changing the speed of the vehicle, thereby altering the levitation generated.

\* \* \* \* \*